United States Patent
Esaki et al.

[11] Patent Number: 5,664,929
[45] Date of Patent: Sep. 9, 1997

[54] ARTICLE TRANSPORTATION SYSTEM

[75] Inventors: Kunio Esaki, Komaki; Haruhiro Watanabe, Kasugai, both of Japan

[73] Assignee: Daifuku Co., Ltd., Japan

[21] Appl. No.: 664,789

[22] Filed: Jun. 17, 1996

Related U.S. Application Data

[63] Continuation of Ser. No. 128,521, Sep. 29, 1993, abandoned.

[30] Foreign Application Priority Data

| Oct. 1, 1992 | [JP] | Japan | 4-263409 |
| Apr. 30, 1993 | [JP] | Japan | 5-103383 |
| Apr. 30, 1993 | [JP] | Japan | 5-103384 |

[51] Int. Cl.⁶ .................................................. B60T 7/16
[52] U.S. Cl. .............. 414/398; 414/222; 414/278; 414/351; 191/1 R; 198/346.1
[58] Field of Search ............... 198/346.1, 303; 307/9.1, 10.7; 414/273, 277, 278, 279, 285, 222, 349, 351, 344, 352, 353, 398, 390; 364/424.01, 424.02

[56] References Cited

U.S. PATENT DOCUMENTS

| Re. 26,770 | 1/1970 | Lemelson | 198/346.1 X |
| 4,286,911 | 9/1981 | Benjamin | 191/1 X |
| 4,700,121 | 10/1987 | Neri | 414/278 X |
| 4,792,995 | 12/1988 | Harding | 414/351 X |
| 4,795,859 | 1/1989 | Kato et al. | 191/11 X |
| 4,944,357 | 7/1990 | Wible | 414/278 X |
| 5,202,832 | 4/1993 | Lisy | 414/351 X |

FOREIGN PATENT DOCUMENTS

| 62-2802 | 1/1987 | Japan . |
| 63-169221 | 11/1988 | Japan . |
| 1740210 | 6/1992 | U.S.S.R. | 191/4 |

*Primary Examiner*—Frank E. Werner
*Attorney, Agent, or Firm*—Webb Ziesenheim Bruening Logsdon Orkin & Hanson, P.C.

[57] ABSTRACT

An article transportation system includes a transporter vehicle driven by an electric power from a battery mounted on the vehicle and a station having a translator apparatus for translating an article to and from the vehicle. The station includes a power receiving unit for receiving electric power for driving the translator apparatus. The transporter vehicle includes power supplying devices for supplying the electric power from the battery to the power receiving unit.

28 Claims, 6 Drawing Sheets

ARTICLE TRANSPORTATION SYSTEM

This is a continuation of application Ser. No. 08/128,521 filed on Sep. 29, 1993, now abandoned.

BACKGROUND OF THE INVENTION

1. FIELD OF THE INVENTION

The present invention relates to an article transportation system, and more particularly to a system including a transporter vehicle driven by an electric power from a battery mounted on the vehicle and a station having a translator apparatus for translating an article to and from the vehicle.

2. DESCRIPTION OF THE RELATED ART

A plurality of stations each equipped with a translator apparatus for translating an article to and from a transporter vehicle are disposed aside a traveling line of the vehicle. The stations need to be supplied with an electric power for driving their translator apparatuses. For this, the prior art has provided an electric wiring work for each station to be supplied with the electric power (e.g. see Japanese laid-open utility model gazette No. 63-169221).

However, when the stations are used, for instance, as stations for supplying or withdrawing various kinds of articles to or from an assembly line, due to a modification of this assembly line, there occasionally arises the necessity of adding new stations or moving the once-installed stations to new locations.

Then, according to the prior art, since the wiring work is needed for each station in order to supply the electric power for the translator apparatus of the station, such addition of new stations or movement of the old stations may prove very difficult. In this respect, the conventional art has room for improvement.

The present invention attends to the above-described state of the art. A primary object of the present invention is to provide an article transportation system which significantly facilitates addition of new stations or movement of the old stations in the system.

SUMMARY OF THE INVENTION

For accomplishing the above-noted object, an article transportation system, according to the present invention, comprises:
- a transporter vehicle driven by an electric power from a battery mounted on the vehicle; a station having a translator apparatus for translating an article to and from the vehicle;
- wherein the station includes a power receiving means for receiving electric power for driving the translator apparatus; and
- the transporter vehicle includes power supplying means for supplying the electric power from the battery to the power receiving means.

According to this construction, for translating an article or an object between the vehicle and the station, the transporter vehicle travels by the electric power from the battery mounted on the vehicle and makes a stop at a predetermined position of the station. Then, the power supply means of the vehicle is connected with the power receiving means of the station for supplying the power of the battery mounted on the vehicle to the station, which power is used for driving the translator apparatus of the station so as to translate the article between the vehicle and the station.

Accordingly, the translator apparatus of the station may be driven by the power of the battery mounted on the vehicle. Consequently, it becomes unnecessary to provide the electric wiring work to each station; and this construction allows easy addition of new stations and/or movement of the old stations in the system.

According to one aspect of the invention, the vehicle further includes a vehicle communication device storing article-translation confirmation information, while the station further includes a station communication device energized by the power received through the power receiving means from the vehicle for communicating the article-translation confirmation information with the vehicle, so that initiation and completion of the article translation operation may be controlled and communicated between the vehicle and the station based on the information.

According to this construction, the communication of the article translation confirmation information between the vehicle and the station may be effected by means of the power from the battery of the vehicle. Therefore, again, the station needs no electric wiring work for the information communication with the vehicle; and the addition of new stations or the movement of the old stations is further facilitated.

According to a further aspect of the present invention, an article transportation system comprises:
- a transporter vehicle traveling and transporting an article to and from a plurality of stations;
- wherein, the station includes a translator apparatus for translating the article between the station and the vehicle, a control apparatus for controlling operations of the translator apparatus, and a battery for driving the control apparatus; and
- wherein, the station further includes a switching means for switching ON/OFF power transmission from the battery to the control apparatus; and
- wherein, the vehicle includes a switch control means for causing the switching means to switch ON the power transmission when an article translation operation is initiated between the vehicle and this station and for causing the switching means to switch OFF the power transmission when the article translation operation is completed.

According to the above-described construction, the station includes the switching means for selectively allowing and inhibiting the power transmission from the battery to the control apparatus, and the vehicle includes the switch control means for causing the switching means to switch ON the power transmission when an article translation operation is initiated between the vehicle and this station and for causing the switching means to switch OFF the power transmission when the article translation operation is completed. Then, for translating an article between the vehicle and the station, the vehicle travels to and makes a stop at the predetermined stop position of the station, and then the switch control means of the vehicle causes the switching means of the station to switch ON to allow power transmission from the battery to the control apparatus. This energizes the control apparatus to allow confirmation of the vehicle being stopped at the proper position of the station. With this confirmation, an article is translated between the station and the vehicle. Thereafter, when the translation operation is completed, the switch control means of the vehicle causes the switching means to switch OFF to break the power transmission from the battery to the control apparatus, thereby to de-energize this control apparatus.

That is to say, the control apparatus is supplied with the power from the battery when an article translation operation between the vehicle and the station is initiated, and the power supply is stopped when the translation operation is completed. Thus, this construction provides the advantage of power waste over the conventional art where a weak electric current is constantly supplied to the apparatus. Consequently, the construction can promote power saving of the station and it becomes possible to reduce the capacitance of the battery and the frequency of battery charging operation.

According to a still further aspect of the present invention, the above-mentioned switching means is normally urged to the switch-OFF state thereof, and the switch control means includes a switch control member projectable to press the switch means to its switch-ON state and a control portion for controlling projection and retraction of the switch control member.

With this arrangement, when the vehicle makes a stop at the predetermined stop position of the station, the control portion causes the switch control member to project to press the switching means, whereby this switching means is switched to its switch-ON state against the urging force to the switch-OFF state and is maintained at the switch-ON state. Then, as the control portion causes the switch control member to retract, the switching means is urged back to the switch-OFF state and maintained at this state.

In short, the switch control means, which is normally urged to the switch-OFF state, is switched over between the two states by means of the switch control member which in turn is projected or retracted by the switch control portion. This can simplify the construction of the switch control means. More specifically, if the switch means comprises a rotary operation type, the switch control means will be complicated as needing to rotate the switch means while holding the same. Then, with the above-described arrangement, the switch means is operated simply by projecting or retracting movement of the switch control means. Thus, this switch control means can be very simple in construction.

According to a still further aspect of the present invention, the station includes a power receiving unit for receiving power for driving the electric-powered apparatus or charging the battery, while the switch control member includes a power supplying unit connectable with the power receiving unit in association with a projecting movement of the switch control member.

With this construction, the power receiving unit and the power supplying unit become connected with each other as the switching means of the station is switched ON by the projecting motion of the switch control member. Also, the power receiving unit and the power supplying unit become disconnected from each other as the switching means is switched OFF by the retracting motion of the switch control member.

In short, the switch control member acts also as a member for controlling the power supply. This advantageously simplifies the components of the construction and also further improves the power saving characteristics of the system.

According to a still further aspect of the invention, the system comprises:

a transporter vehicle traveling and transporting an article to and from a plurality of stations;

wherein, the vehicle includes a dc/ac converter for converting a direct current from a battery into an alternating current, and a power supplying unit; and wherein, the station includes, an ac-power-driven article translator apparatus, a control apparatus, the battery, and a power receiving unit connectable with the power supplying unit when the vehicle stops at a predetermined stop position of the station;

the power supplying unit supplying the ac power from the dc/ac converter;

the ac-power-driven translator apparatus being connected with the power receiving unit so as to be driven by the ac-power from this power receiving unit; and wherein, the station further includes a rectifying device for rectifying the ac-power received by the power receiving unit.

With this construction, the power to be supplied from the vehicle to the station comprises the ac-power alone.

Incidentally, it is also conceivable to provide the dc/ac converter to the station. Yet, as the dc/ac converter generally has a more complicated construction than the rectifying device, such arrangement will be disadvantageous for facilitating the addition and movement of the stations.

On the other hand, according to the above-described construction of the present invention, the station is provided with the rectifying device which is simple in construction, thus, this construction is advantageous for facilitating the addition and movement of the stations. The construction requires only addition of an ac-connector to the power supplying unit and the power receiving unit of the vehicle and the station, respectively. Consequently, through the simplification of the construction for the power supply from the vehicle to the station, it has become possible to reduce the costs of the entire system.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of an article transportation system relating to the present invention; in which.

DESCRIPTION OF THE PREFERRED EMBODIMENTS

Preferred embodiments of an article transportation system relating to the present invention will be described next with reference to the accompanying drawings.

Figure 2:
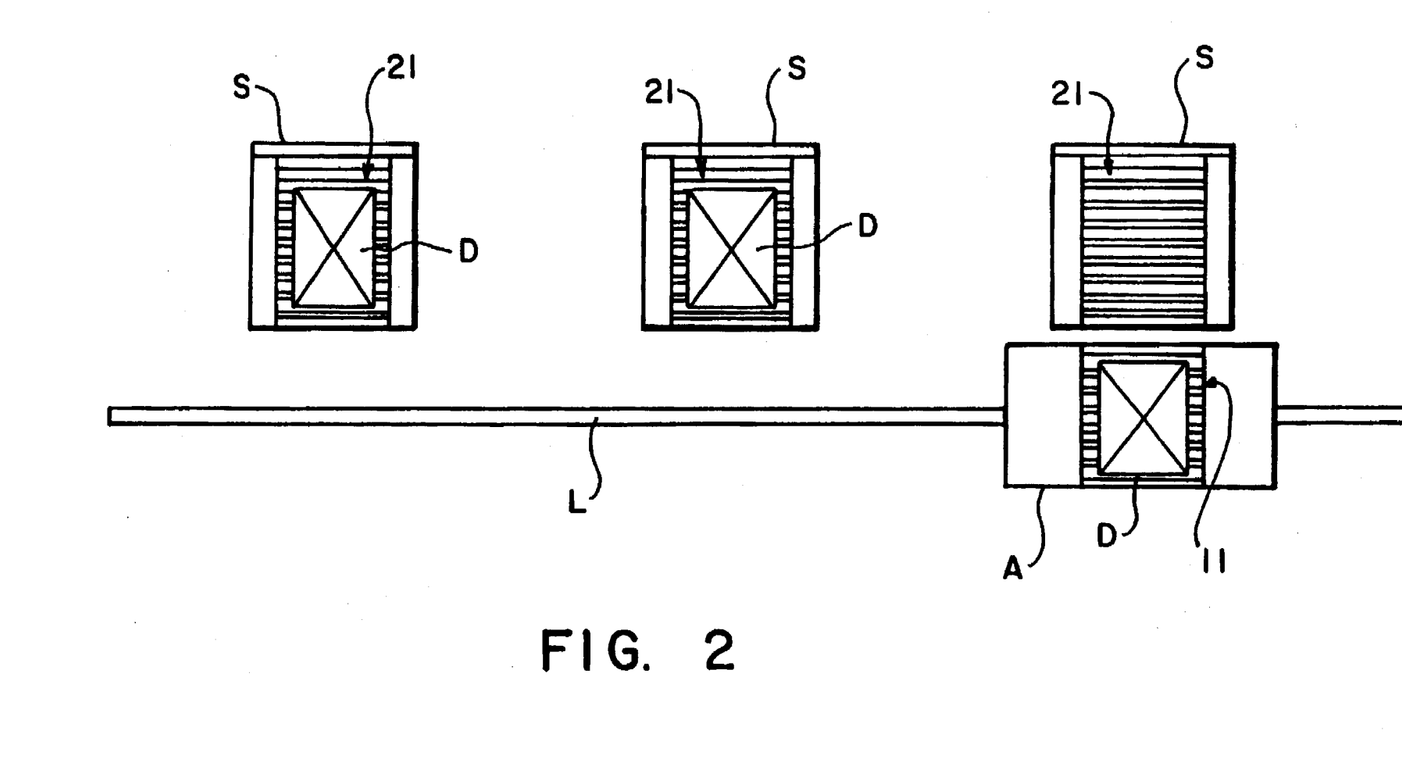
FIG. 2 is a diagram showing an arrangement of components of the transportation system.

FIG. 2 shows an article transportation system according to one preferred embodiment of the present invention. As shown, this system includes a transporter vehicle A traveling along a traveling line installed on a traveling surface and a plurality of stations S each equipped with a translator apparatus 21 for translating an article D to and from the vehicle A. More specifically, the translation operation of the article D is effected between the station S and the vehicle A which is stopped beside this station S.

Figure 1:
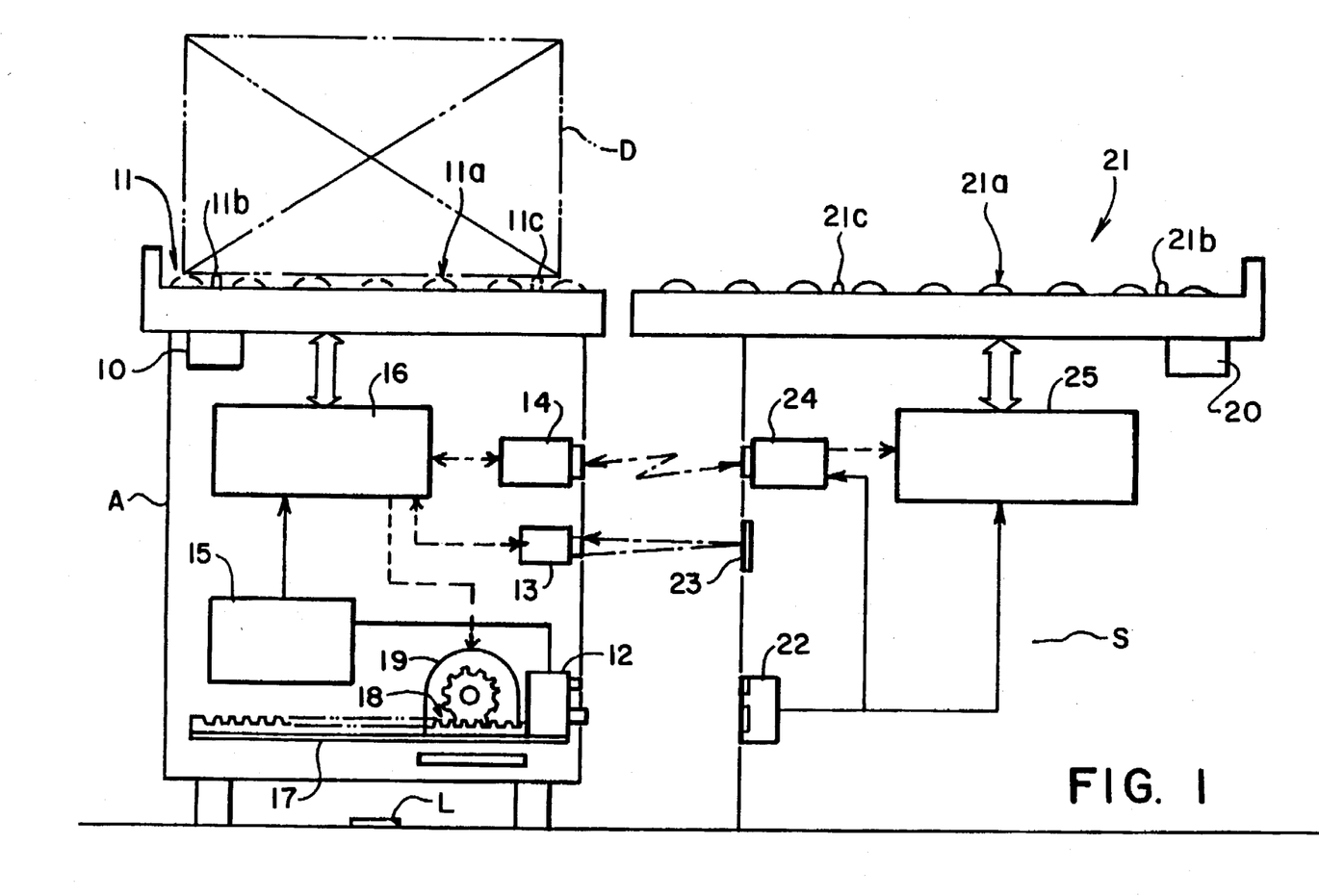
FIG. 1 is a view illustrating a construction of an article transportation system relating to one embodiment of the present invention.

As best shown in FIG. 1, the transporter vehicle A includes a translator apparatus 11 for the translating operation of the article D, an optical sensor 13 comprised essentially of a light emitting element and a light receiving element and used for confirmation of a stop position of the vehicle, an optical communication apparatus 14, a rechargeable battery 15, and a control apparatus 16. On the other hand, the station S includes a translator apparatus 21, a power receiving unit 22 for receiving electric power from the vehicle A, a reflector board 23, an optical communication apparatus 24, and a control apparatus 25.

The vehicle A further includes a power supplying connector 12 for supplying the electric power of the battery 15 to the power receiving unit 22 of the station S.

The power supplying connector 12 is attached to a leading end of an arm 17 which is driven to project or to retract by means of a motor 19 via a rack-pinion 18. More particularly, with forward rotation of the motor 19, the power supplying connector 12 is projected to approach the power receiving unit 22 of the station S to be connected therewith. And, with reverse rotation of the motor 19, the connector 12 is retracted away from the unit 22.

Accordingly, the power supplying connector 12, the arm 17, the rack-pinion 18 and the motor 19 function together as a power supplying means.

The power for operating the translator apparatus 11 of the vehicle, the optical sensor 13, the optical communication apparatus 14, and for propelling the vehicle A is derived from the electric power supplied from the battery 15. And, these operations are controlled by the control apparatus 16 mounted on the vehicle A.

On the other hand, the components of the station, i.e. the translator apparatus 21 and the optical communication apparatus 24 are driven by the power received through the power receiving unit 22. And, these operations are controlled by the control unit 25 which is also driven by the power received through the power receiving unit 22.

The translator apparatus 11 of the vehicle includes a roller conveyer 11a and a motor 10 for driving the roller conveyer 11a. Similarly, the translator apparatus 21 includes a roller conveyer 21a and a motor 20 for driving the roller conveyer 21a.

The two roller conveyers 11a and 21a are driven to rotate in a direction corresponding to a conveying direction of the article D. More particularly, in the case of translating the article from the transportation vehicle A to the station, the roller conveyers 11a, 21a are forwardly rotated in the clockwise direction, in FIG. 1, by the motors 10, 20. Conversely, in the case of the translation operation from the station S to the vehicle A, the roller conveyers 11a, 21a are reversely rotated in the counter-clockwise direction by the motors 10, 20.

On the translator apparatus 11 of the vehicle, there are mounted translation-condition detecting switches 11b, 11c for detecting presence/absence of the article D on the vehicle. On the other hand, the station S also includes translation-condition detecting switches 21b, 21c for detecting presence/absence of the article D on the station S. More particularly, when the article D is present on the vehicle A, at least one of the detecting switches 11b, 11c is turned ON. Whereas, when the article D is present on the station S, at least one of the detecting switches 21b, 21c is turned ON.

Incidentally, the translation-condition detecting switches 11b, 21b act also as means for detecting completion of the translating operation. That is, the translating operation from the vehicle A to the station S is carried out until the detecting switch 21b is turned ON. Whereas, the translating operation from the station S to the vehicle A is carried out until the detecting switch 11b is turned ON.

Accordingly, the detection information from the above-described translation-condition detecting switches 11b, 11c, 21b, 21c is communicated as translation-condition confirmation information between the optical communication apparatus 14 of the vehicle and the optical communication apparatus 24 of the station.

Figure 3:
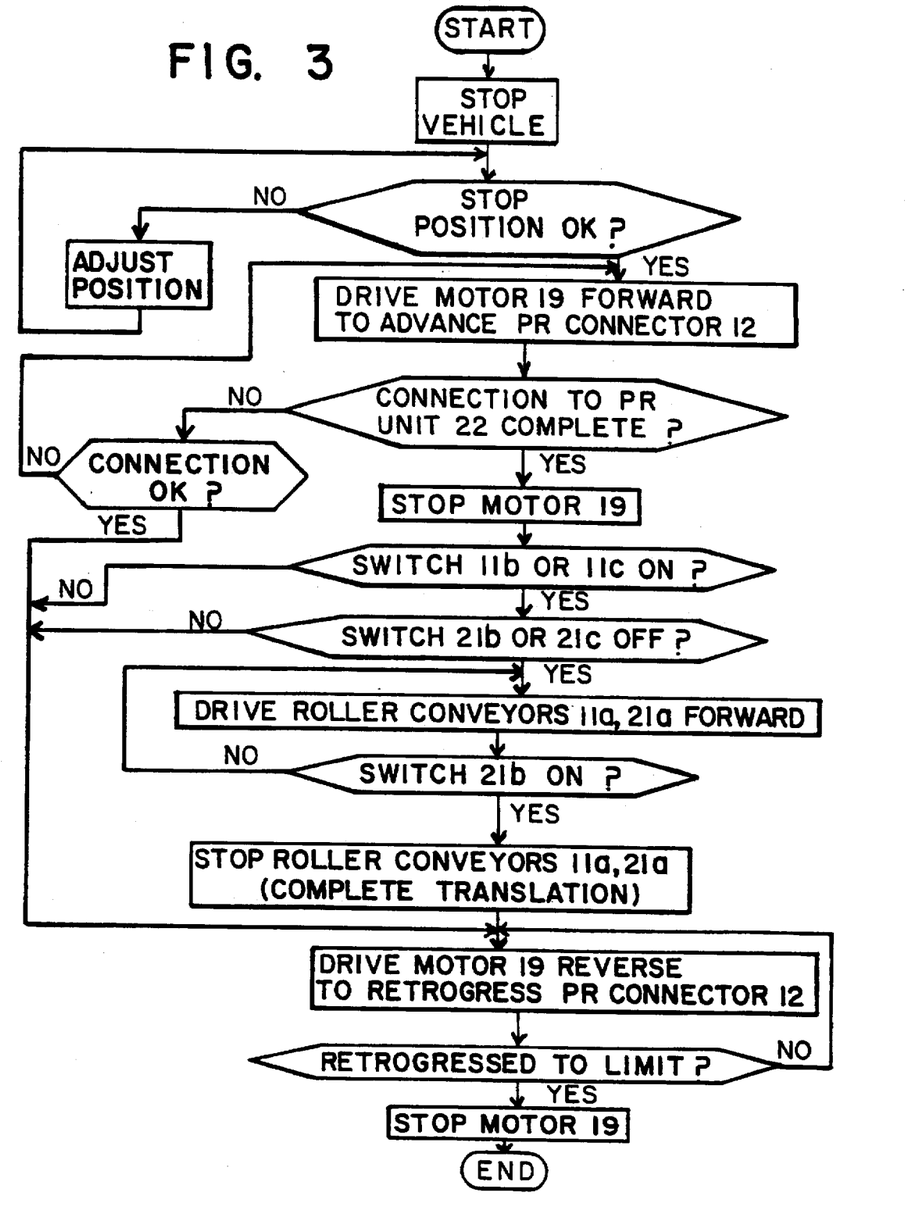
FIG. 3 is a flow chart.

Next, the operational process from the stop of the vehicle A at the station S to the translation operation of the article D from the vehicle A to the station S will be described in details with reference to the flow chart of FIG. 3.

First, the vehicle A makes a stop at a predetermined stop position forwardly of the station S. After the optical sensor 13 comprised of the light emitting element and the light receiving element and the reflector board 23 confirms that the vehicle has stopped at the predetermined position, the control apparatus 16 of the vehicle causes the motor 19 to rotate in the forward direction, thereby to further propel the vehicle for connecting the power supplying connector 12 to the power receiving unit 22 of the station S.

Incidentally, if it is judged that the vehicle A has not stopped at the predetermined position, the stop position is corrected by forwardly or rearwardly moving the vehicle A.

When the power supplying connector 12 becomes connected with the power receiving unit 22, the electric power of the battery 15 mounted on the vehicle A is supplied to the power receiving unit 22, by which power the optical communication apparatus 24 and the control apparatus 25 are energized, so that a signal indicating completion of the connection is set from the optical communication apparatus 24 of the station to the optical communication apparatus 14 of the vehicle.

With receipt of this connection-completion signal from the optical communication apparatus 14, the control apparatus 16 of the vehicle stops the motor 19.

Incidentally, before the motor 19 is stopped after the power supplying connector 12 and the power receiving unit 22 become connected to each other, the power supplying connector 12 is moved forwardly by some distance. For this reason, the power receiving unit 22 is supported with elasticity in the fore and aft direction so as to absorb the forward movement of the power supplying connector 12.

Further, the power supplying connector 12 has an unillustrated limit switch for detecting whether or not the connector 12 has been properly connected with the power receiving unit 22. When the connection between the power supplying connector 12 and the power receiving unit 22 is improper, then, based on an output of the limit switch which has detected this improper connection, the motor 19 is rotated reversely to move the power supplying connector 12 rearwardly.

The control apparatus 25 of the station communicates to the optical communication apparatus 14 of the vehicle about conditions of the translation-condition detecting switches 21b, 21c (i.e. the translation conditions of the article on the translator apparatus 21 of the station).

The control apparatus 16 of the vehicle confirms that both the detecting switches 21b, 21c are in the state of OFF (i.e. no article D is present on the translator apparatus 21 of the station) and confirms also that either one of the translation-condition detecting switches 11b or 11c is in the state of ON (i.e. the article D is present on the translator apparatus 11 of the vehicle). Then, the control apparatus 16 causes the roller conveyer 11a to be driven in the forward direction.

Moreover, the control apparatus 16 of the vehicle transmits to the optical communication apparatus 24 of the station a command signal to drive the roller conveyer 21a of the station in the forward direction.

Upon receipt of this command signal, the control apparatus 25 of the station drives the roller conveyer 21a in the forward direction.

Thereafter, when the translation-condition detecting switch 21b is turned ON, the control apparatus 25 of the station transmits a translation completion signal to the optical communication apparatus 14 of the vehicle and also stops the driving of the roller conveyer 21a.

Upon receipt of the translation completion signal, the control apparatus 16 of the vehicle stops driving the roller conveyer 11a and further causes the motor 19 to rotate reversely so as to move the power supplying connector 12 rearwardly. With this, the article translation operation is completed.

Incidentally, in the case of the translation operation of the article D from the vehicle A to the station S, if the translation-condition detecting switch 11b or 11c is not in the ON state (i.e. the article D is not present on the translator apparatus 11 of the vehicle), or if either one of the translation-condition detecting switches 21b or 21c is in the ON state (i.e. the article D is present on the translator apparatus 21 of the station), the translation operation from the vehicle A to the station S is not possible. Thus, the power supplying connector 12 is moved rearward to complete the operation.

The article translation operation in the opposite direction, i.e. from the station S to the vehicle A is effected in the reverse manner relative to the above-described case from the vehicle A to the station S. Therefore, no flow chart or detailed descriptions will be provided herein in order to avoid redundancy.

Some other embodiments of the present invention will be described next.

(1) In the above-described embodiment, the transporter vehicle A travels along the traveling line L installed on the traveling surface. Instead, it is conceivable to provide the vehicle A with a traveling-direction detecting device such as a gyro compass device and with a traveling-distance detecting device for detecting a traveling distance of the vehicle, so that a present position of the vehicle is detected based on the detection information from these detecting devices and also the vehicle is traveled along a predetermined course.

(2) It is conceivable to provide stop-position indicating marks (comprised of light reflecting tapes or magnetic tapes) on the traveling surface so that the vehicle A is stopped at the predetermined position based on the information of these marks.

Next, still another embodiment of the present invention will be described in details.

Figure 6:
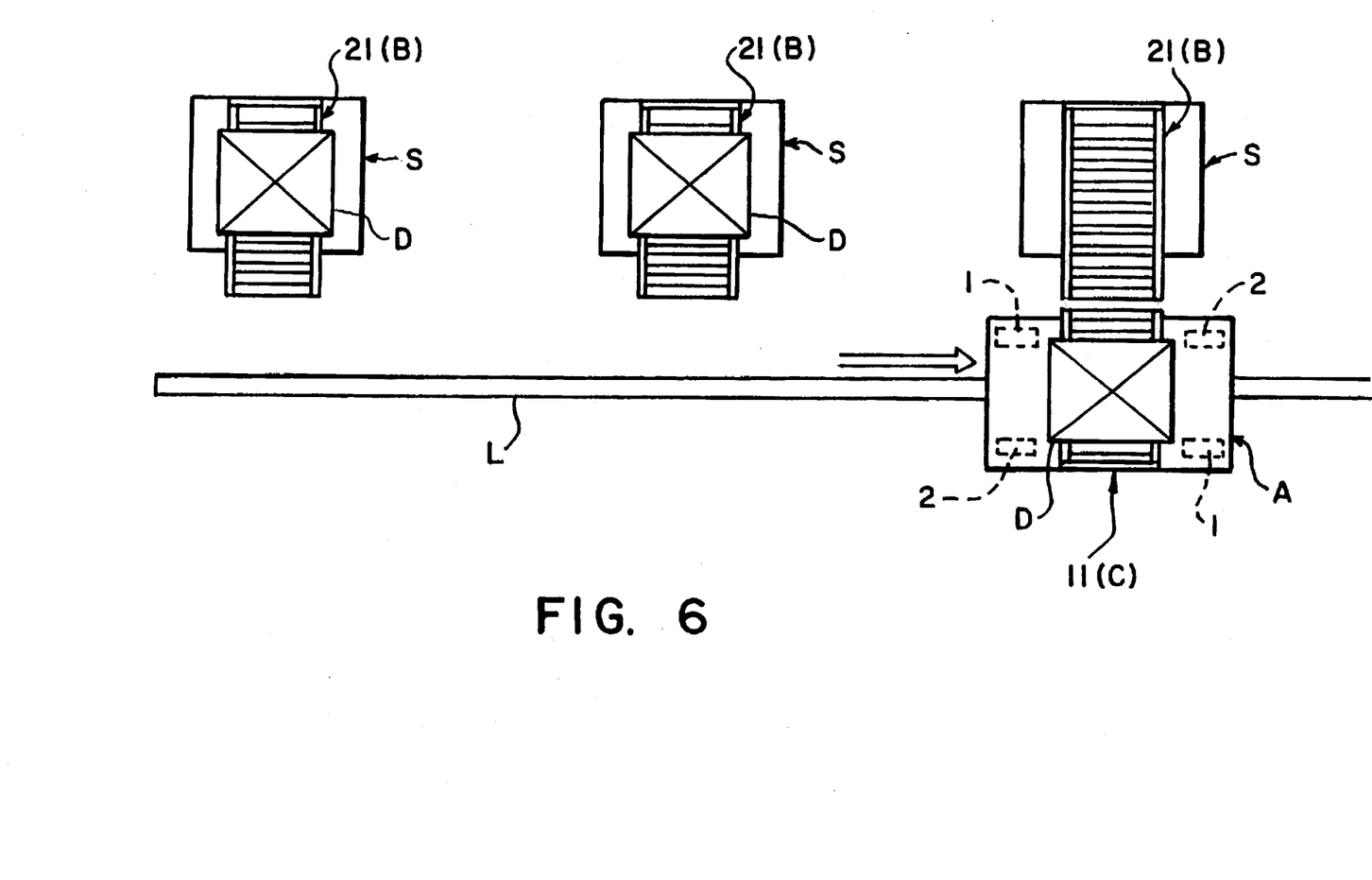
FIG. 6 is a plane view showing a portion of the article transportation system of FIG. 4.

FIG. 6 shows a part of an article transportation system relating to another embodiment. This transportation system includes a plurality of stations S and a transporter vehicle A which travels between the stations S along a guide line L provided as a traveling line on the traveling surface.

Figure 4:
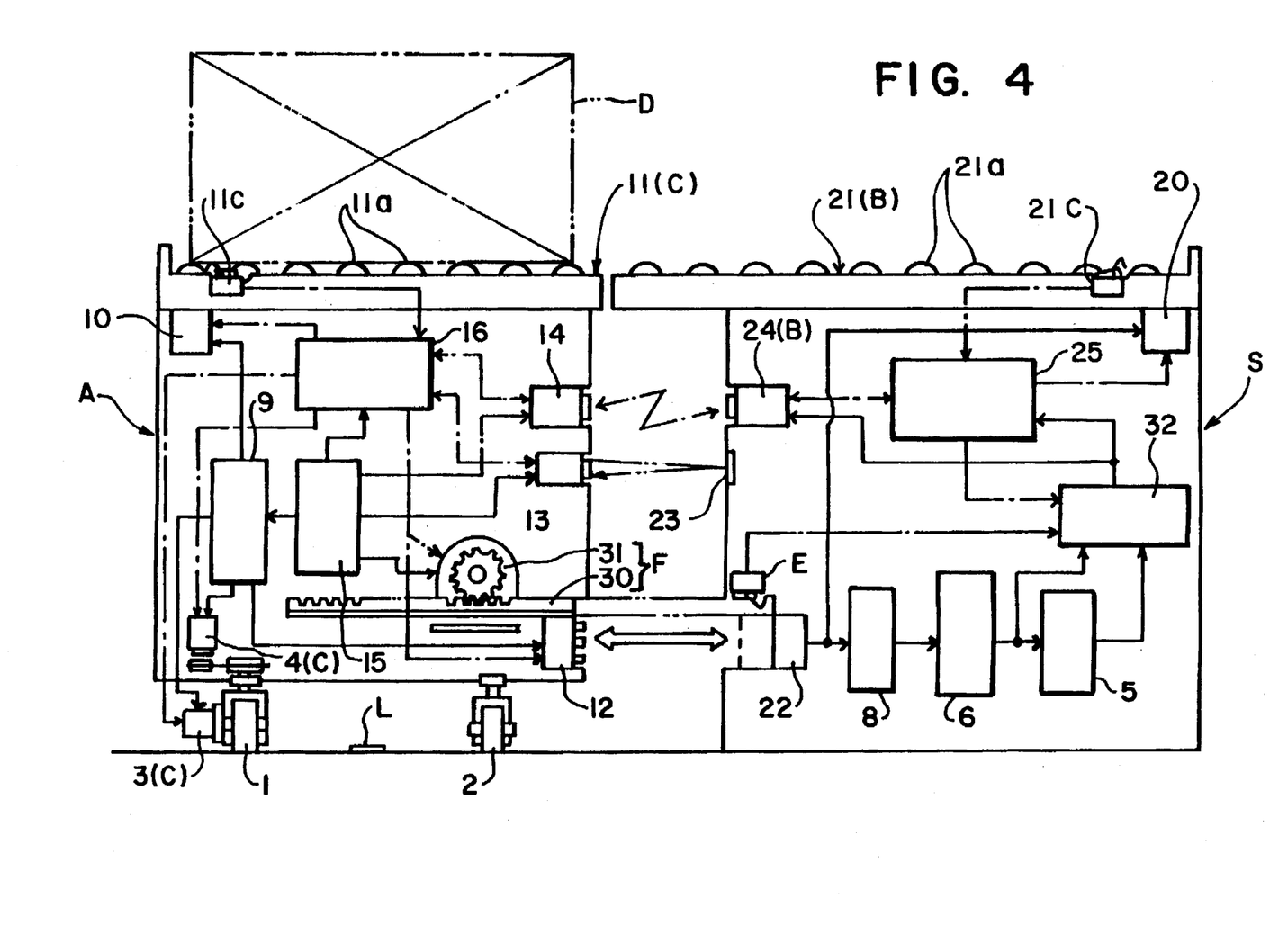
FIG. 4 is a block diagram showing a vehicle and a station relating to a further embodiment of the invention.

As shown also in FIG. 4, the vehicle A includes a pair of driving wheels 1 and a pair of driven wheels 2. The vehicle A further includes a propelling motor 3 for propelling the driving wheels 1, a steering motor 4 for steering the driving wheels 1, an article translator apparatus 11 for translating an article D to and from the stations S, and an optical sensor 13 comprised of a light emitting element and a light receiving element for confirming a stop position of the vehicle, an optical communication apparatus 14 for communicating article translation information with the stations S, a control apparatus 16 for controlling the above-mentioned components and a rechargeable battery 15 for supplying a direct current power. Further, as the propelling motor 3, the steering motor 4 and the article translator apparatus 11 are ac-driven operation apparatuses C, the vehicle A further includes a dc-ac converter 9 for converting the dc power from the battery 15 into ac power. That is, the ac-driven operation apparatuses C are supplied with the ac power.

On the other hand, each station S includes an ac-driven article-translator apparatus 21 for translating the article D to and from the vehicle A, an optical communication apparatus 24 for communicating article-translation information with the vehicle A, a control apparatus 25 for controlling the above-mentioned apparatuses, a rechargeable battery 5 for driving the control apparatus 25a, and a reflector board 23 for reflecting light emitted from the light emitting element of the optical sensor 13. The ac-driven article-translator apparatus 12 and the optical communication apparatus 24 comprise dc-driven apparatuses B driven by dc power.

The article-translator apparatus 11 mounted on the vehicle A includes a roller conveyer 11a, an ac-powered motor 10 for driving the roller conveyer 11a, and an article detecting switch 11c for detecting presence/absence of the article D on the vehicle A. The ac-driven translator apparatus 21 of the station S includes a roller conveyer 21a, an ac-powered motor 20 for driving the roller conveyer 21a, and an article detecting switch 21 for detecting presence/absence of the article D on the station S. The article detecting switches 11c, 21c act also as translation-condition detecting means for detecting completion of translation operation of the article D. More particularly, in FIG. 4, in case the article D is to be translated from the vehicle A to the station S, the roller conveyers 11a, 21a are driven in the clockwise direction until the detecting switch 21c detects presence of the article D. On the other hand, in case the article D is to be translated from the station S to the vehicle A, the roller conveyers 11a, 21a are driven in the counter-clockwise direction until the detecting switch 11c detects presence of the article D.

Figure 5:
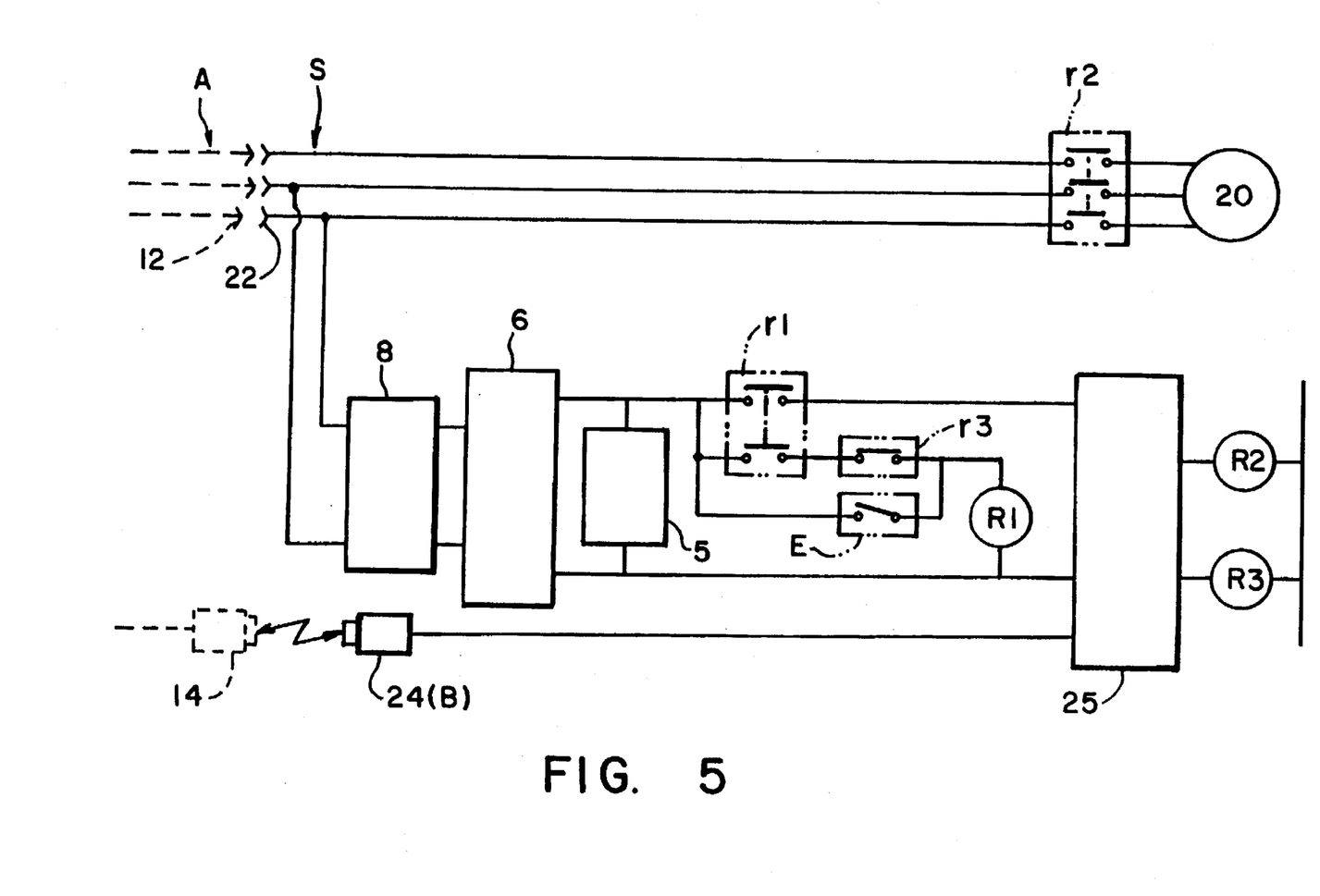
FIG. 5 is an electric circuit diagram incorporated in the station of FIG. 4.

As shown in FIGS. 4 and 5, the ac-driven article-translator apparatus 21 and the dc-driven apparatuses B of the station S are both driven by the electric power supplied from the vehicle A. Also, the battery 5 of the station S is charged by the electric power from the vehicle A.

To describe more particularly, the transporter vehicle A mounts a power supplying unit 12 for supplying to the station S the electric power from the battery 15 which power has been converted from dc power into ac power by means of the dc-ac converter 9. On the other hand, the station S includes a power receiving unit 22 connectable with the power supplying unit 12 of the vehicle A to be supplied with the power from the vehicle A, a transformer 8 for transforming the potential of a part of the ac power from the power receiving unit 22, and a rectifier 6 for rectifying the ac power from the transformer 8 into dc power. In operation, when the power supplying unit 12 of the vehicle A becomes connected with the power receiving unit 22 of the station S, the ac power from the vehicle A is diverged within the station S, so that a portion of the power is directly supplied to the ac-driven article-translator apparatus 21 of the station while the remaining portion of the power is provided to the transformer 8 and the rectifier 6 to be converted into dc power to be supplied to the dc-driven apparatuses B or to the battery 5.

For selectively allowing and inhibiting power supply from the battery 5 to the control apparatus 25, the station S includes a limit switch E which acts as a switch means and which is normally urged to its open position. On the other hand, the vehicle A includes a switch control means F including a switch operating member 30 for depressing to close the limit switch E of the station S, and an electric motor 31 for projecting or retracting the switch operating member 30 by forwardly or reversely rotating a pinion gear meshing with a rack portion formed in the switch control member 30. Incidentally, the above-described power supplying unit 12 is provided at the switch operation side of the switch operating member 30. Thus, when the limit switch E of the station S is depressed to its closed position, the power supplying unit 12 becomes connected with the power receiving unit 22.

Next, a translation operation of the article D from the vehicle A to the station S will be particularly described with reference to FIGS. 4 through 6.

As shown in FIG. 6, first, the vehicle A is controlled to travel to a target station S. When reaching this target station S, the vehicle A is stopped at a position predetermined relative to the station S, as being controlled by the optical sensor 13 for confirming the stop position of the vehicle A and the reflector board 23 of the station S. When the vehicle is stopped at the predetermined position, as illustrated in FIG. 4, the vehicle A causes the switch operating member 30 to project thereby to depress the limit switch E of the station S. With this depression of the limit switch E, this limit switch E is brought into the closed condition as illustrated in FIG. 5, thereby to allow power supply from the battery 5 to a first relay R1. This closes a first relay switch r1 to allow power supply from the battery 5 to the control apparatus 25, thereby to energize this control apparatus 25. The control apparatus 25, first requests power supply through the optical communication apparatus 24. Upon receipt of this request, the control apparatus 16 of the vehicle A confirms the connection between the power supplying unit 12 and the power receiving unit 22 and then the power supply from the vehicle A to the station S is started. With starting of power supply, the translation of the article D between the vehicle A and the station S is confirmed by means of the optical communication apparatuses 14, 24. When the translation of the article D has been confirmed, the control apparatus 16 of the vehicle A activates the translator apparatus 11, and the control apparatus 25 of the station S allows power supply to a second relay R2 to close a second relay switch r2 thereby to activate the translator apparatus 21. With these activations, the translation operation of the article D from the vehicle A to the station S is initiated. Then, when the presence of the article D turns ON the detecting switch 21c of the translator apparatus 21, the control apparatus 25 of the station S stops the translator apparatus 21 and also communicates completion of the translation operation to the vehicle through the optical communication apparatus 24. Upon reception of this communication, the control apparatus 16 of the vehicle A stops the translator apparatus 11, stops the power supply to the station S and retracts the switch operating member 30. With completion of the retracting movement of the switch operating member 30, the control apparatus 16 of the vehicle communicates this completion of retracting operation of the member 30 by means of the optical communication apparatus 14. Upon receipt of this communication, the control apparatus 25 of the station S allows power supply to a third relay R3 to open a third relay switch r3. With this, the power supply to the first relay R1 is stopped to open the first relay switch r1, thereby to stop the power supply from the battery 5 to the control apparatus 25 to de-energize this control apparatus 25. The above-described first relay R1, the first relay switch r1, the third relay R3 and the third relay switch r3 together constitute a self-hold circuit 32. Thereafter, the transporter vehicle A is controlled to travel to a next target station S.

Further modifications of the present invention are possible as follow.

(1) The vehicle A may travel along a guide rail or travel without such guide rail.

(2) Instead of driving the electric-powered apparatuses B of the station S by the power supplied from the vehicle A, it is also conceivable for these apparatuses B to be driven by the battery 5 mounted on the station S.

(3) Either the vehicle A or the station S may mount a fork-lift type article translator apparatus.

(4) For de-energizing the control apparatus 25 of the station S, in place of the self-hold circuit 32 employed in the above-described embodiment, it is also conceivable for the control apparatus 25 to be directly stopped in association with the opening movement of the switch means E.

(5) The switch operating means F can be modified in a variety of manners. For instance, instead of the arrangement in which the switch means E is closed and opened in association with the projecting and retracting motions of the switch operating member 30, the switch means E may be opened and closed by a rotary operation. It is also conceivable to provide the switch operating member 30 and the power receiving unit 12 separately from each other. It is further conceivable for the communication circuitry to be connected in association with the projecting motion of the switch operating member 30. The electric-powered motor 31 may be replaced by an electromagnetic cylinder.

(6) The switch means E may comprise a lead switch, for instance.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which become within the meaning and range of equivalency of the claims are therefore intended to be embraced therein.

What is claimed is:

1. A transportation system for transporting an article, said transportation system comprising a transporter vehicle and a station, wherein said transporter vehicle includes a frame having a plurality of wheels rotatably mounted thereon, a vehicle battery, a propelling motor connected to propel said wheels, a vehicle translator apparatus mounted on said frame, said vehicle translator including a vehicle translator motor and a vehicle conveyor, said vehicle translator motor connected to drive the vehicle conveyor, a power supplying means including a retractable arm having a power supplying connector connected to a leading end of said arm and means for projecting and retracting said arm, said power supplying connector connected to receive electrical power from said vehicle battery, a vehicle controller connected to receive electrical power from said vehicle battery and which controls the supply of electrical power to the propelling motor, the vehicle translator motor and the means for projecting and retracting said arm, and a vehicle communication apparatus connected to said vehicle controller, and wherein said station includes, a power receiving unit engageable with said power supplying connector of said arm for receiving electric power therefrom, a station translator apparatus including a station translator motor and a station conveyor, said station translator motor connected to drive the station conveyor, a station controller connected to receive electric power from the power supplying connector and which controls the supply of electrical power to the station translator motor, and a station communication apparatus connected to said station controller, wherein:

said station communication apparatus and said vehicle communication apparatus enable communication of information between said station controller and said vehicle controller, and said station controller communicates to said vehicle controller in response to receiving electrical power from the power supplying connector.

2. A system according to claim 1, wherein said means for projecting and retracting said arm includes an arm having a leading end thereof connected with said power supplying connector, a rack-pinion for projecting and retracting said arm, and a motor for driving said rack-pinion.

3. A system according to claim 1, wherein said transporter vehicle further includes an optical sensor connected to said vehicle controller, said optical sensor comprised of a light emitting element and a light receiving element for confirming a stop position to the vehicle controller.

4. A system according to claim 3, wherein said station further includes a reflector board for confirming, in cooperation with said optical sensor, whether the vehicle has stopped at the stop position.

5. A system according to claim 1, wherein said station controller and said vehicle controller coordinate the translation of the article between the vehicle conveyor and the station conveyor in response to said vehicle controller receiving communication from the station controller.

6. A system according to claim 5, wherein said vehicle includes an article detection means positioned adjacent the conveyor of the vehicle translator for detecting the presence/absence of the article on the vehicle conveyor, wherein said vehicle condition detection means is electrically connected to said vehicle controller for communicating the detected presence/absence of the article to said vehicle controller.

7. A system according to claim 6, wherein said station includes a station detection means positioned adjacent the conveyor of the station translator for detecting the presence/absence of the article on the station conveyor, wherein said station condition detection means is electrically connected to said station controller for communicating the detected presence/absence of the article to said station controller.

8. A system according to claim 1, wherein said station further includes a station battery connected to receive electrical power from the power receiving unit and to provide electrical power to the station control apparatus.

9. A system according to claim 8, wherein said station further includes a switch means electrically connected between the station controller and the station battery, and wherein said vehicle further includes a switch control means which activates said switch means to electrically connect the station controller to the station battery when the translation of an article between the conveyor of the vehicle translator and the conveyor of the station translator is initiated and which deactivates said switch means when the translation of an article between the conveyor of the vehicle translator and the conveyor of the station translator is completed.

10. A system according to claim 9, wherein the switch control means is positioned adjacent the leading end of the retractable arm to engage the switch means when the retractable arm is projected.

11. A system according to claim 9, wherein the station further includes a self-hold circuit electrically connected between the station battery and the station controller and responsive to the station controller for selectively maintaining electrical connection between the station battery and the station controller when the switch means is deactivated.

12. A system according to claim 11, wherein the vehicle further includes a dc/ac convertor connected between the vehicle battery and the power supplying connector for converting dc from the vehicle battery to ac at the power supplying connector, and wherein the station translator motor is an ac motor.

13. A system according to claim 12, wherein the vehicle further includes a rectifier electrically connected between the power receiving unit and the station battery for converting ac supplied to the power receiving unit to dc supplyable to at least one of the vehicle battery and the self-hold circuit.

14. A system according to claim 13, wherein the vehicle further includes a transformer electrically connected between the power receiving unit and the rectifier.

15. An article transportation system comprising: a transporter vehicle including a frame having a plurality of wheels rotatably mounted thereon, a vehicle battery, a propelling motor connected to propel said wheels in response to electrical energy supplied by said vehicle battery, a vehicle translator apparatus mounted on said frame, said vehicle translator including a vehicle translator motor and a vehicle conveyor wherein said vehicle translator motor is connected to drive the vehicle conveyor in response to electrical energy supplied by said vehicle battery, a power supplying means, said power supplying means including a retractable arm having a power supplying connector connected to a leading end of said arm and means for projecting and retracting said arm wherein said power supplying connector is electrically connected to said vehicle battery, and a switch control means, and a station including a power receiving unit configured to engage said power supplying connector of said arm, a station translator apparatus including a station translator motor and a station conveyor wherein said station translator motor is connected to drive the station conveyor in response to electrical energy supplied from the power receiving unit, a control apparatus for controlling operations of the station translator motor, a station battery for driving the control apparatus, and a switching means for switching ON/OFF power transmission from said station battery to said control apparatus, wherein:

the switch control means causes said switching means to switch ON the power transmission when an article translation operation is initiated between the vehicle conveyor and the station conveyor and for causing the switching means to switch OFF the power transmission when the article translation operation is completed.

16. A system according to claim 15, wherein a switching means is normally urged to the switch-OFF state thereof, and said switch control means includes a switch control member projectable to press the switching means to its switch-ON state and a control portion for controlling projection and retraction of the switch control member.

17. A system according to claim 16, wherein said station includes the power receiving unit for receiving power for driving said translator or charging said station battery, while said switch control member includes a power supplying unit connectable with said power receiving unit in association with a projecting movement of said switch control member.

18. A system according to claim 16, wherein said switching means is a limit switch and said control portion is an electric motor, so that a switch operating member is projected or retracted by forward or reverse rotation of said electric motor via a pinion meshing with a rack portion formed in said switch operating member.

19. The article transportation system of claim 15 further including:
- a vehicle controller connected to receive electrical power from said vehicle battery and which controls the supply of electrical power to the propelling motor, the vehicle translator motor and the means for projecting and retracting said arm;
- a vehicle communication apparatus connected to said vehicle controller; and
- a station communication apparatus connected to said control apparatus, wherein:
    said station communication apparatus and said vehicle communication apparatus enable communication of information between said control apparatus and said vehicle controller.

20. The article transportation system of claim 15, wherein the transporter vehicle further includes a dc/ac converter connected to receive dc from the vehicle battery and to provide ac to the propelling motor, the vehicle translator motor and the power supplying connector, and wherein the station further includes a rectifying device between the power receiving unit and the station battery for rectifying the ac received by the power receiving unit into rectified dc and for supplying the rectified dc to the station battery, wherein the station translator motor is adapted to drive the station conveyor in response to ac supplied from the power receiving unit.

21. The article transportation system of claim 15, wherein said vehicle includes an article detection means positioned adjacent the conveyor of the vehicle translator for detecting the presence/absence of the article on the vehicle conveyor, wherein said vehicle condition detection means is electrically connected to said vehicle controller for communicating the detected presence/absence of the article to said vehicle controller.

22. An article transportation system comprising: a transporter vehicle including
- a frame having a plurality of wheels rotatably mounted thereon,
- a vehicle battery,
- a dc/ac converter which converts dc from the vehicle battery to ac,
- a propelling motor connected to propel said wheels in response to electrical energy supplied by said dc/ac converter,
- a vehicle translator apparatus mounted on said frame, said vehicle translator including a vehicle translator motor and a vehicle conveyor, wherein said vehicle translator motor is connected to drive the vehicle conveyor in response to electrical energy supplied by said dc/ac converter, and
- a power supplying means, said power supplying means including a retractable arm having a power supplying connector connected to a leading end of said arm and means for projecting and retracting said arm wherein said power supplying connector receives electrical power from said dc/ac converter, a station including
- a power receiving unit configured to engage said power supplying connector of said arm,
- a station translator apparatus including a station translator motor and a station conveyor, wherein said station translator motor is connected to drive the station conveyor in response to electrical energy supplied from the dc/ac converter via the power receiving unit,
- a control apparatus for controlling operations of the station translator motor,
- a station battery for driving the control apparatus, and
- a rectifying device between the power receiving unit and the station battery for rectifying the ac received by the power receiving unit into rectified dc and for supplying the rectified dc to the station battery.

23. A system according to claim 22, wherein the ac is supplied from said power receiving unit to said rectifying device through a transformer.

24. A system according claim 22, wherein driving of said control apparatus from said station battery is effected through a self-hold circuit.

25. The article transportation system of claim 22, wherein said vehicle includes translation condition detecting means which detects the presence/absence of an article on said vehicle conveyor and causes said vehicle translator motor to operate as a function of said detected presence/absence of said article on said conveyor.

26. The article transportation system of claim 22 further including:
- a vehicle controller connected to receive electrical power from said vehicle battery and which controls the supply of electrical power to the propelling motor, the vehicle translator motor and the means for projecting and retracting said arm;
- a vehicle communication apparatus connected to said vehicle controller; and
- a station communication apparatus connected to said control apparatus, wherein:
    said station communication apparatus and said vehicle communication apparatus enable communication of information between said control apparatus and said vehicle controller.

27. An article transportation system comprising:
- a transporter vehicle having a frame for supporting an article during transportation, a plurality of wheels rotatably mounted on said frame and driven by a propelling motor supplied with electric power from a vehicle battery mounted on the vehicle, a dc/ac converter for converting a direct current from said vehicle battery into an alternating current and a power supplying means having a retractable arm with a power supplying connector attached to a leading end of said arm and means for projecting and retracting said arm, wherein said dc/ac converter is connected to said power supplying connector; and
- a station having an ac-powered station translator motor connected to drive a station conveyor that translates said article to and from the vehicle frame in response to being driven by said station translator motor, a control apparatus for controlling operations of said station translator motor, a station battery for driving the control apparatus, and a power receiving unit connectable with the power supplying means for receiving electric power from the dc/ac converter for driving said station translator motor when the vehicle stops at a predetermined stop position of the station, wherein:

said station further includes a switching means for switching ON/OFF power transmission from said station battery to said control apparatus, said vehicle includes a switch control means for causing said switching means to switch ON the power transmission when an article translation operation is initiated between the vehicle and the station and for causing the switching means to switch OFF the power transmission when the article translation operation is completed, and the station further includes a rectifying device connected between the power receiving unit and the station battery for rectifying the ac-power received by the power receiving unit into dc-power for said station battery.

28. The article transportation system of claim 27, wherein said station includes station translation condition detecting means which detects the presence/absence of an article on said station conveyor and causes said station translator motor to operate as a function of said detected presence/absence of said article on said conveyor.

* * * * *

UNITED STATES PATENT AND TRADEMARK OFFICE
CERTIFICATE OF CORRECTION

PATENT NO. : 5,664,929
DATED : September 9, 1997
INVENTOR(S) : Kunio Esaki and Haruhiro Watanabe

It is certified that error appears in the above-identified patent and that said Letters Patent is hereby corrected as shown below:

Column 8 Line 53 "the power from" should read --the ac power from--.

Signed and Sealed this

Third Day of February, 1998

Attest:

BRUCE LEHMAN

Attesting Officer

Commissioner of Patents and Trademarks